(12) United States Patent
Aguilar

(10) Patent No.: US 6,827,494 B2
(45) Date of Patent: Dec. 7, 2004

(54) DIVERTED FLOW THRUST BEARING

(75) Inventor: Scott Grover Aguilar, La Crescenta, CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/279,485

(22) Filed: Oct. 23, 2002

(65) Prior Publication Data

US 2003/0039417 A1 Feb. 27, 2003

Related U.S. Application Data

(63) Continuation-in-part of application No. 09/874,808, filed on Jun. 5, 2001, now abandoned.

(51) Int. Cl.[7] ............................ F16C 32/06; F16C 33/10
(52) U.S. Cl. ........................ 384/121; 384/123; 384/368
(58) Field of Search ................................ 384/107, 112, 384/121, 122, 123, 303–307, 368, 420, 425

(56) References Cited

U.S. PATENT DOCUMENTS

| | | | | |
|---|---|---|---|---|
| 2,362,667 | A | * | 11/1944 | Schmidt ..................... 384/305 |
| 2,731,305 | A | | 1/1956 | Wilcock |
| 3,370,897 | A | | 2/1968 | Rylatt |
| 3,895,689 | A | * | 7/1975 | Swearingen ................ 384/121 |
| 4,383,771 | A | | 5/1983 | Freytag et al. |
| 4,421,425 | A | * | 12/1983 | Foucher et al. ............. 384/123 |
| 4,479,728 | A | | 10/1984 | Miller |
| 4,501,505 | A | * | 2/1985 | Chambers ................... 384/152 |
| 4,863,291 | A | * | 9/1989 | Heshmat et al. ............ 384/305 |
| 5,829,338 | A | * | 11/1998 | Chrestoff et al. ........... 384/121 |
| 5,951,172 | A | * | 9/1999 | Byrne ........................ 384/313 |
| 5,973,878 | A | | 10/1999 | Yoshida et al. |
| 6,045,266 | A | * | 4/2000 | Mitsubori et al. .......... 384/123 |
| 6,089,754 | A | * | 7/2000 | Wilkes et al. ............... 384/122 |

FOREIGN PATENT DOCUMENTS

DE 832968 3/1952

OTHER PUBLICATIONS

Jim Ball; "Controlled Inlet"; Feb. 16, 1998; Design News.

* cited by examiner

*Primary Examiner*—Thomas R. Hannon
(74) *Attorney, Agent, or Firm*—Ephraim Starr; John Christopher James

(57) ABSTRACT

A hydrodynamic thrust bearing of this invention comprises a body having a load-bearing surface comprising an oil supply channel and an oil return channel positioned along respective inside and outside body diameters. A number of thrust pads are positioned along the surface that each include an oil supply groove, positioned adjacent a leading edge/upstream portion of each thrust pad and extending radially a distance from the oil supply channel, and an oil return groove, positioned adjacent a trailing edge/downstream portion of each thrust pad and extending radially a distance from the oil return channel. The oil supply grooves are separate from the oil return grooves, and the thrust pads each comprise a series arrangement of three differently configured land or pad sections. Configured in this manner, oil is provided onto the series of land sections by the oil supply groove and is collected after passing over the series of land sections by the separate oil collection groove. The use of separate oil supply and collection grooves acts to minimize mixing, of input oil with the heated return oil, thereby reducing oil film temperature and increasing bearing thrust load capacity.

14 Claims, 2 Drawing Sheets

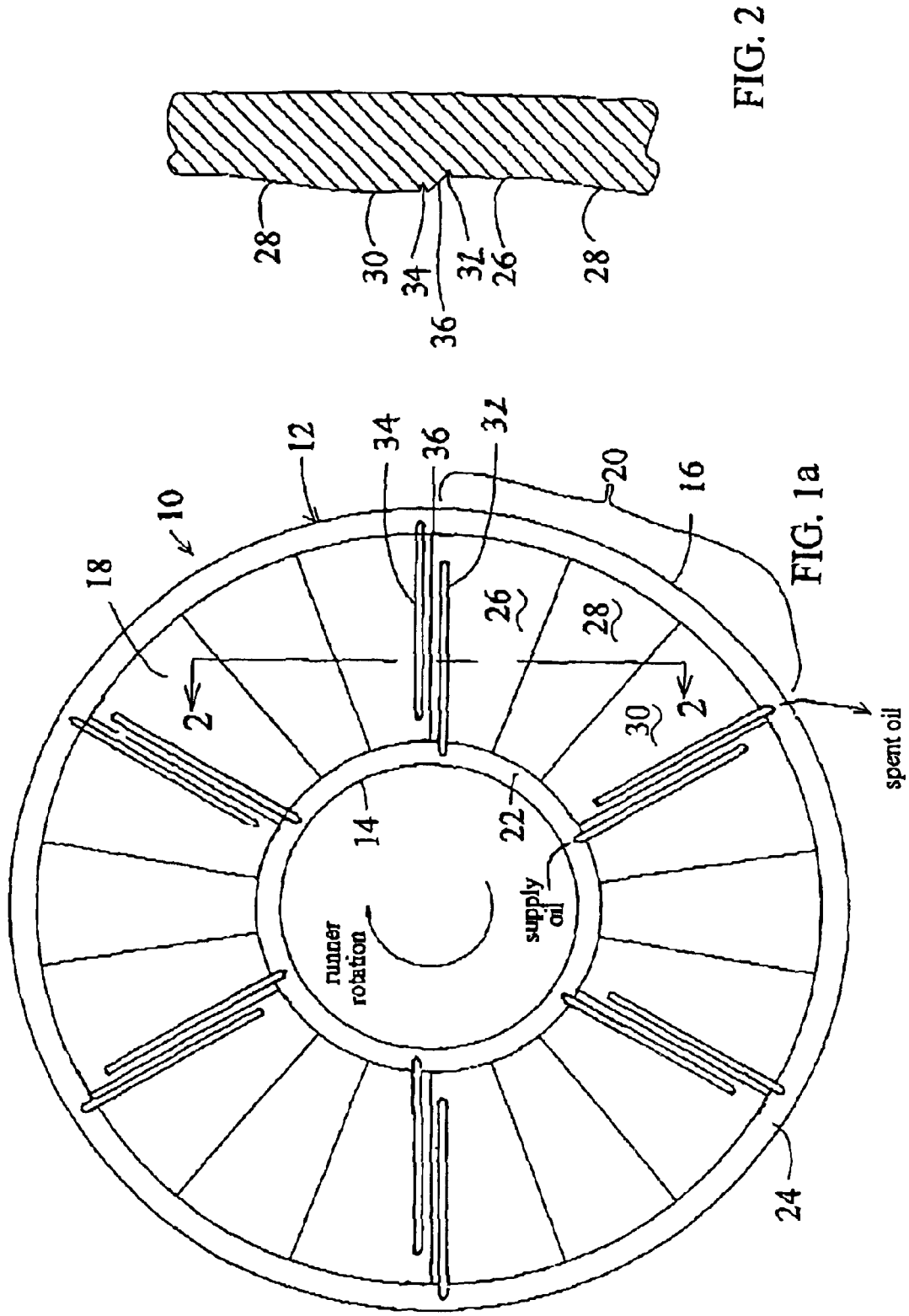

DIVERTED FLOW THRUST BEARING

RELATION TO COPENDING PATENT APPLICATION

This patent application is a continuation-in-part of U.S. patent application Ser. No. 09/874,808 filed on Jun. 5, 2001 now abandoned.

FIELD OF THE INVENTION

This invention relates generally to the field of turbochargers and, more particularly, to a turbine shaft thrust bearing having separate oil inlet and oil outlet paths across a bearing axial surface, thereby providing improved bearing thrust load capacity and reduced oil film temperature.

BACKGROUND OF THE INVENTION

Turbochargers for gasoline and diesel internal combustion engines are devices known in the art that are used for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor mounted onto an opposite end of the shaft. Thus, rotary action of the turbine also causes the air compressor to spin within a compressor housing of the turbocharger that is separate from the exhaust housing. The spinning action of the air compressor causes intake air to enter the compressor housing and be pressurized or boosted a desired amount before it is mixed with fuel and combusted within the engine combustion chamber.

The common shaft extending between the turbine and compressor is disposed through a turbocharger center housing that includes a bearing assembly for: (1) facilitating shaft rotation; (2) controlling axially directed shaft thrust effects and radially directed shaft vibrations; (3) providing necessary lubrication to the rotating shaft to minimize friction effects and related wear; and (4) providing a seal between the lubricated assembly and the turbine and compressor housings. The common shaft as used in turbocharger applications is known to have shaft-rotating speeds on the order of 60,000 to 80,000 rpm, and in some applications up to 280,000 rpm. Under such operating conditions it is imperative that the bearing assembly provide sufficient lubrication to the shaft to minimize the extreme friction effects that take place at such high rotating speeds, thereby extending shaft service life.

A thrust bearing is installed in the turbocharger center housing and is generally used to support the axially directed thrust, or thrust load, that is imposed on the turbine shaft. The thrust bearing can either be hydrodynamic or non-hydrodynamic. As used herein, the term "hydrodynamic" is understood to refer to pumped oil migration, or diverted oil flow, across an axial face of a thrust bearing, and the term "non-hydrodynamic" is understood to refer to a type of thrust bearing that is not designed to pump oil across an axial thrust bearing face or surface.

Hydrodynamic thrust bearings known in the art comprise an annular body that is disposed within the turbocharger bearing housing, around the turbine shaft. Such bearing includes one or more axially-facing load-bearing surfaces. Turbocharger thrust bearings are usually two-sided, and are required to react loads in both axial directions. This concept applies whether one two-sided bearing handles thrust in both directions, or whether the thrust directions are reacted through two separate bearings. The load-bearing surfaces are is positioned adjacent an opposed thrust runner surface that is attached to and rotates with the shaft assembly. The load-bearing surfaces include a number of grooves or channels that are disposed radially thereacross from an inside bearing diameter to an outside bearing diameter. Each such groove is configured identically and is separated by a surface section or pad.

In such conventional hydrodynamic thrust bearing the load-bearing surface, comprising the arrangement of grooves and pads, is designed to distribute lubricating oil thereover in the following manner. Fresh oil is pumped into an inlet end of a oil groove that is positioned at a leading inside diameter edge of each load-bearing pad section. The oil migrates radially outwardly in the groove, circularly over the pad and radially towards a load-bearing surface outside diameter. As the oil is moved over the pad it is heated by the thrust bearing surface and the shearing action of the viscous load-carrying film. The oil continues to move circularly to a trailing edge of the load-bearing pad where it is passed to an adjacent radial groove that is operating to provide supply oil to an adjacent/downstream pad. Thus, the hot oil exiting one pad exits the load-bearing surface via a groove that is also used to provide cool supply oil to an adjacent pad section, thereby adversely impacting the ability of such thrust bearing design to provide a desired degree of cooled oil to the load-bearing surface sections.

Hydrodynamic thrust bearings provide a thrust load capacity that is dependent on the operating temperature of the oil film disposed between the thrust bearing and the adjacent rotating thrust runner. It is a well known fact that the thrust load capacity for such bearings is inversely proportional to the oil film temperature across the bearing. It has been discovered that the above-described hydrodynamic thrust bearings do not provide a maximum degree of thrust load capacity because of the high oil-film temperatures that are experienced across the bearing. A reduced thrust load capacity has an adverse impact on turbocharger service life as is allows undesired turbine shaft axial play that causes premature turbine bearing and seal wear. An inefficient thrust bearing design also leads to higher frictional losses in the turbocharger's bearing system, and lower overall turbocharger mechanical efficiency.

It is, therefore, desirable that a hydrodynamic thrust bearing be constructed that has an improved thrust load capacity when compared to conventional hydrodynamic thrust bearings. It is also desired that such thrust bearing be capable of increasing the thrust load capacity without adversely impacting other performance areas of the thrust bearing itself and the bearing assembly. It is further desired that such thrust bearing be capable of fitment with existing turbocharger devices without extensive redesigning.

SUMMARY OF THE INVENTION

Hydrodynamic thrust bearings, constructed according to principles of this invention, comprise an axially-directed annular surface that is specially designed to promote oil migration thereacross in a manner that minimizes oil film temperature, thus maximizing thrust load capacity. Specifically, hydrodynamic thrust bearings of this invention comprise a body having a load-bearing surface that includes an oil supply channel and an oil return channel disposed along respective inside and outside body diameters.

The thrust bearings body includes a number of thrust pads positioned between the oil supply and return channels. An oil supply groove is positioned along each thrust pad leading/upstream edge and extends radially a distance from the oil supply channel. An oil return groove is positioned along each thrust pad trailing/downstream edge and extends radially a distance from the oil return channel. The oil supply and oil return grooves are separate from one another.

In a preferred embodiment, the thrust pads comprise a series arrangement of three differently configured land sections. Configured in this manner, oil is provided onto the series of land sections by the oil supply groove and is collected after passing over the series of land sections by the separate oil collection groove. The use of separate oil supply and collection grooves operates to minimize undesired oil mixing, i.e., supply oil mixing with the heated or discharge oil, thereby reducing oil film temperature and increasing bearing thrust load capacity.

BRIEF DESCRIPTION OF THE DRAWINGS

The details and features of the present invention will be more clearly understood with respect to the detailed description and the following drawings, wherein:

FIG. 1a illustrates a schematic front end view of hydrodynamic thrust bearing constructed according to principles of this invention;

FIG. 2 illustrates a cross-sectional side view across section 2—2 of the hydrodynamic thrust bearing of FIG. 1.

DETAILED DESCRIPTION OF THE INVENTION

Figure 1B:
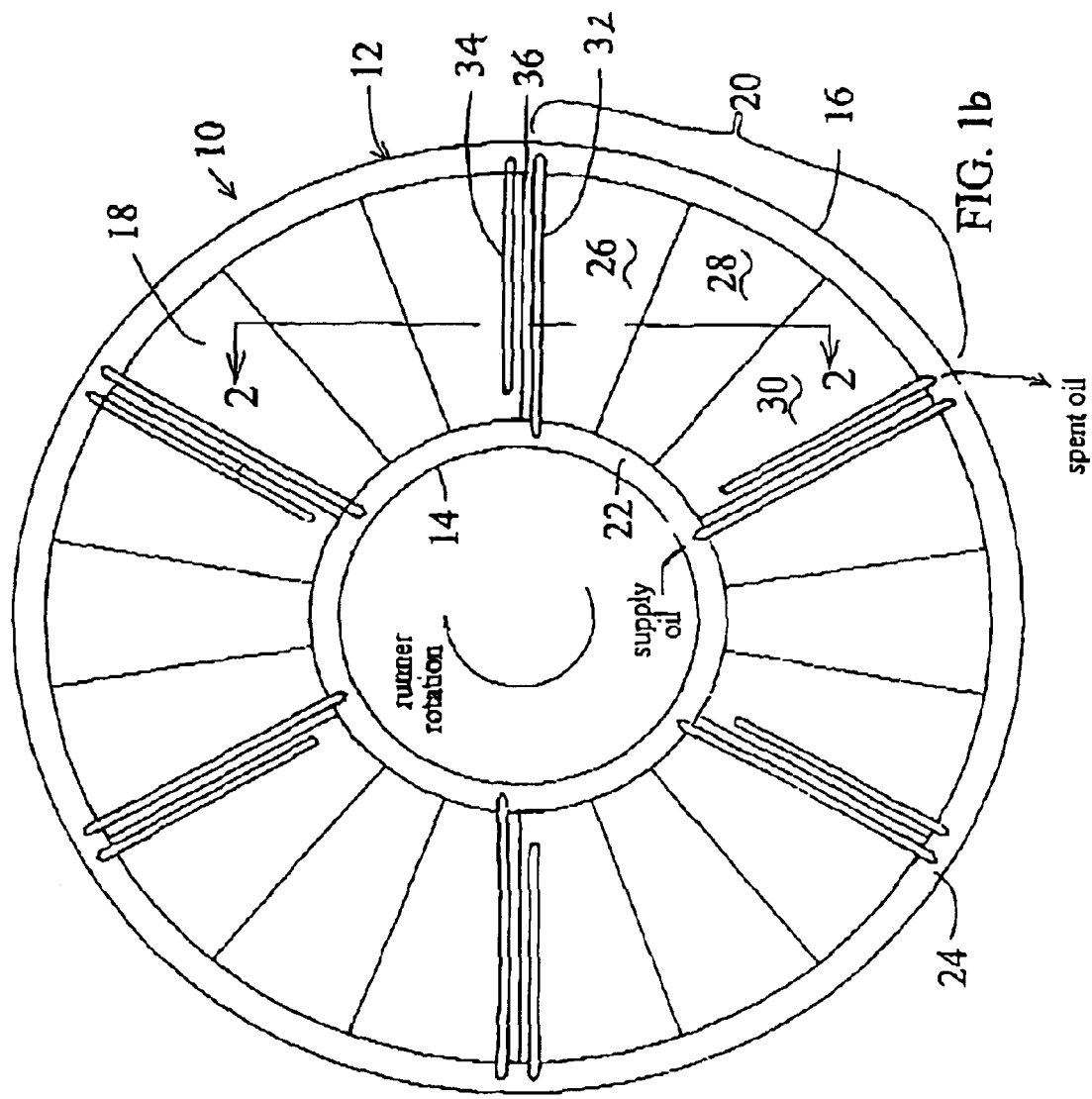
FIG. 1b illustrates a schematic front end view of a second embodiment of the hydrodynamic thrust bearing constructed according to principles of this invention.

Referring to FIG. 1a, a hydrodynamic thrust bearing 10 of this invention has an annular body 12 comprising an inside diameter 14 and an outside diameter 16. The inside diameter is sized to accommodate placement of a turbine shaft (not shown), or alternatively a shaft bearing member (not shown), therein. The bearing includes an axially-directed face 18 that is designed to be positioned adjacent a turbocharger shaft member bearing surface (not shown) to control the extent of axial turbine shaft displacement within the housing. It is to be understood that thrust bearings of this invention can have one or both axially-directed load bearing surfaces configured in the manner described below.

The axially-directed load bearing face 18 comprises a repeating serial arrangement of three land sections 20, wherein each serial arrangement defines a thrust bearing thrust pad. An oil supply channel 22 is disposed along the bearing inside diameter along the axially-directed face 18, and an oil return or collection channel 24 is disposed along the bearing outside diameter along the axially directed face 18. The series arrangements of the three land sections 20 extend radially across the axially-directed face 18 between the oil supply and collection channels.

Each series arrangement of lands/thrust pads 20 comprises, moving clockwise across FIG. 1a, a lower land 26, a ramp 28, and an upper land 30. The lower land 26 is an arc section of the thrust bearing face 18 that extends circumferentially across the face between an oil supply groove 32 and the ramp 28. The oil supply groove 32 is disposed a determined depth within the face 18 and extends radially from the oil supply channel 22 a defined distance thereacross. In one bearing embodiment, the oil supply groove 32 extends radially across the face only a partial distance and not to the oil collection channel 24 (the embodiment shown in FIG. 1a). In another embodiment, the oil supply groove 32 extends radially across the face a complete distance to the oil collection channel 24 (the embodiment shown in FIG. 1b). The oil supply groove 32 is designed to direct supply oil from the oil supply channel 22 to the lower land 26 for distribution across the thrust pad for forming a thrust-load bearing oil film layer thereon.

The ramp 28 comprises an arc section of the face that extends circumferentially across the face between the lower and 26 and the upper land 30. As best shown in FIG. 2, the ramp 28 is configured having an upwardly directed slope moving from the lower land to the upper land. Accordingly, oil that is passed to the ramp from the lower land is compressed against an adjacent planar surface of a thrust runner (not shown) before being passed to the upper land. This oil compression is caused by the rotary action of the thrust runner attached to the turbocharger shaft, and is necessary for forming a desired hydrodynamic effect between the bearing and the thrust runner surface.

The upper land 30, as the name implies, comprises an arc section of the bearing face 18 that is positioned axially above both the lower lamp 26 and the ramp 28. The upper land 30 extends circumferentially across the face from the ramp 28 to an oil return or collection groove 34. The oil return groove 34 is disposed a depth within the face and extends radially inwardly a partial distance thereacross from the oil return channel 24. The oil return groove 24 terminates before reaching the oil supply channel 22 to prevent the fresh supply oil from entering and mixing with the heated return oil collected from the thrust pads. Oil entering the oil return groove 34 is directed radially therealong to the oil return channel 24 where it is collected and removed from the bearing.

Thus, configured in this manner, supply oil is provided from the oil supply channel 22 to each thrust pad 20 by a single oil groove 32 adjacent each thrust pad lower land 26. As the thrust runner rotates against the bearing, the supply oil is whisked radially and circumferentially across each thrust pad, forming a thin hydrodynamic film layer between the bearing face and an adjacent thrust runner surface. Heated oil is removed from each thrust pad and collected within the oil collection channel 24 via the oil return groove 34 positioned adjacent each thrust pad upper land 34. As the thrust runner is rotated, oil is continuously provided to the thrust pads, used to create a desired hydrodynamic oil film layer thereon, and is removed from the thrust pads in this manner.

To prevent the unwanted migration of oil between each oil supply groove and an adjacent oil return groove, a separator 36 is disposed therebetween. The separator 36 extends radially along the bearing face 18 from the oil supply channel 22 to the oil return or collection channel 24 and, as best shown in FIG. 2, the separator is in the form of a rib that projects above each of the bordering grooves to act as a barrier to prevent oil from moving therebetween.

The use of separate oil supply and return grooves is an important feature of this invention as it prevents the relatively cooler supply oil from mixing together with the hot return oil during turbocharger operation, i.e., thrust runner rotation, thereby both reducing the oil film temperature across the bearing face, and improving the thrust load carrying capacity of the bearing.

Having now described the invention in detail as required by the patent statutes, those skilled in the art will recognize modifications and substitutions to the specific embodiments disclosed herein. Such modifications are within the scope and intent of the present invention described generally as:

What is claimed is:

1. A hydrodynamic thrust bearing comprising:
   an annular bearing body having central shaft opening and an axially-directed face at one of the body axial ends, the face comprising:
   an oil supply channel disposed adjacent a body inside diameter;
   an oil return channel disposed adjacent a body outside diameter;
   a number of thrust pads interposed between the oil supply and oil return channels, the thrust pads defined along one end surface by an oil supply groove extending radially a partial distance across the face from the oil supply channel, and defined along another end surface by an oil return groove extending radially a partial distance across the face from the oil return channel, the oil supply groove and the oil return groove being separated from one another by a separator rib that prevents oil migration therebetween.

2. A hydrodynamic thrust bearing as recited in claim 1 wherein a leading edge of each of the thrust pads is adjacent the oil supply groove and the trailing edge of each pad is adjacent the oil return groove.

3. A hydrodynamic thrust bearing as recited in claim 1 wherein each thrust pad comprises a serial arrangement of three different pad sections comprising:
   a first pad positioned adjacent the oil supply groove;
   a second pad positioned adjacent oil return groove; and
   a third pad interposed between the first and second pads.

4. A hydrodynamic thrust bearing as recited in claim 3 wherein the second pad is elevated a distance above the first and third pads, and wherein the third pad is elevated a distance above the first pad.

5. A hydrodynamic thrust bearing as recited in claim 1 wherein each oil supply channel extends to the oil return channel.

6. A hydrodynamic thrust bearing for use in a turbocharger comprising:
   an annular bearing body having central shaft opening and an axially-directed face at one of the body axial ends for placement adjacent a rotating thrust runner attached to a turbocharger shaft, the face comprising:
   an oil supply channel positioned adjacent a body inside diameter;
   a oil return channel positioned adjacent a body outside diameter;
   a number of thrust pads positioned radially between the oil supply and oil return channels;
   an oil supply groove extending radially a distance from the oil supply channel along the face and positioned along a leading edge of each thrust pad;
   an oil return groove extending radially a distance from the oil return channel along the face and positioned along a trailing edge of each thrust pad;
   wherein the each oil supply groove is separate from an adjacent oil return groove; and
   wherein each of the thrust pads comprise a serial arrangement of differently elevated sections comprising:
   a first pad section disposed adjacent the oil supply groove;
   a second pad section disposed downstream of the first pad; and
   a third pad section disposed adjacent the oil return groove and positioned downstream from the second pad.

7. A hydrodynamic thrust bearing as recited in claim 6 further comprising a rib projecting upwardly a distance from the face and extending radially between the oil supply and oil return channels to separate the same.

8. A hydrodynamic thrust bearing as recited in claim 6 wherein each oil supply groove comprises a terminal end positioned radially inwardly of the oil return channel.

9. A hydrodynamic thrust bearing as recited in claim 8 wherein each oil return groove comprises a terminal end positioned radially outwardly of the oil supply channel.

10. A hydrodynamic thrust bearing as recited in claim 6 wherein each oil supply groove comprises a terminal end that extends to the oil return channel.

11. A hydrodynamic thrust bearing as recited in claim 6 wherein the third pad is elevated a distance above the first and second pads.

12. A hydrodynamic thrust bearing as recited in claim 11 wherein the second pad is elevated a distance above the first pad.

13. A hydrodynamic thrust bearing for use in a turbocharger comprising:
   an annular bearing body having central shaft opening and an axially-directed face at one of the body axial ends for placement adjacent a rotating thrust runner attached to a turbocharger shaft, the face comprising:
   an oil supply channel positioned adjacent a body inside diameter;
   an oil return channel positioned adjacent a body outside diameter;
   a number of thrust pads positioned radially between the oil supply and oil return channels;
   an oil supply groove extending radially a distance from the oil supply channel along the face and positioned along a leading edge of each thrust pad;
   an oil return groove extending radially a distance from the oil return channel along the face and positioned along a trailing edge of each thrust pad; and
   a rib projecting upwardly a distance from the face and extending radially between the oil supply and oil return channels to separate the same.

14. A hydrodynamic thrust bearing for use in a turbocharger comprising:
   an annular bearing body having central shaft opening and an axially-directed face at one of the body axial ends for placement adjacent a rotating thrust runner attached to a turbocharger shaft, the face comprising:
   an oil supply channel positioned adjacent a body inside diameter;
   an oil return channel positioned adjacent a body outside diameter;
   a number of thrust pads positioned radially between the oil supply and oil return channels;
   an oil supply groove extending radially a distance from the oil supply channel along the face and positioned along a leading edge of each thrust pad;
   an oil return groove extending radially a distance from the oil return channel along the face and positioned along a trailing edge of each thrust pad;
   wherein the each oil supply groove is separate from an adjacent oil return groove; and
   wherein each oil supply groove comprises a terminal end that extends to the oil return channel.

* * * * *